July 15, 1924.
J. OAKLEY
BROACH
Filed April 12, 1921
1,501,716
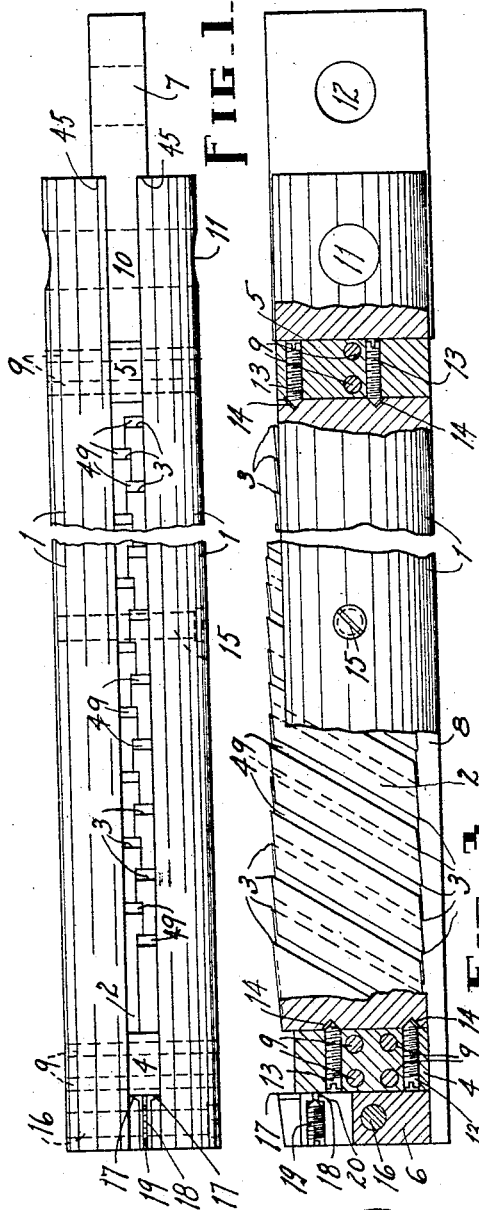
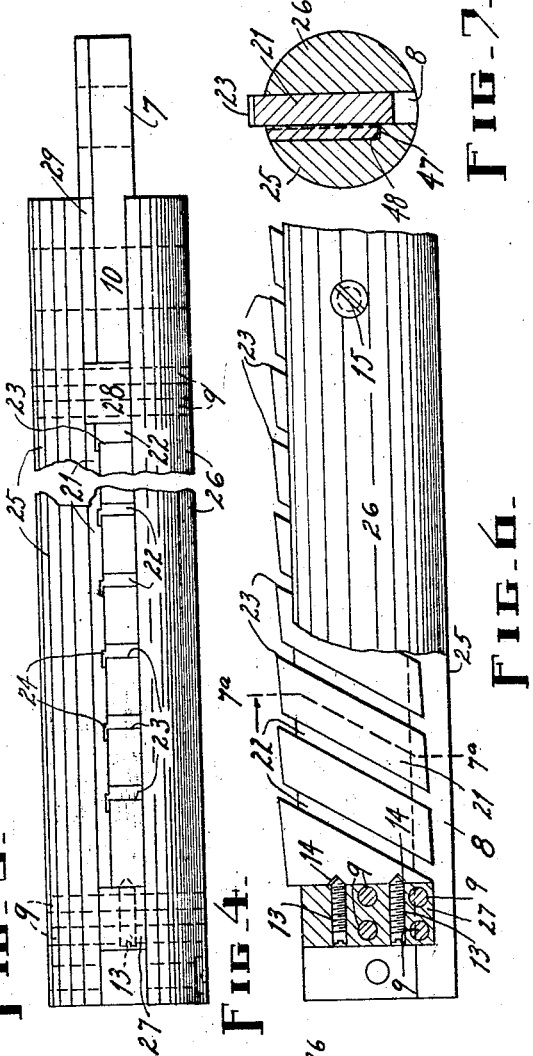
INVENTOR.
John Oakley,
BY
Frank A. Cutter,
ATTORNEY.
WITNESS:
C. C. West.

Patented July 15, 1924.

1,501,716

UNITED STATES PATENT OFFICE.

JOHN OAKLEY, OF SPRINGFIELD, MASSACHUSETTS.

BROACH.

Application filed April 12, 1921. Serial No. 460,730.

*To all whom it may concern:*

Be it known that I, JOHN OAKLEY, a subject of the King of England, and a resident of Springfield, in the county of Hampden and State of Massachusetts, have invented a new and useful Broach, of which the following is a specification.

My invention relates to improvements in broaches for cutting internal slots and grooves, and consists of a divided or two-part shank, one or more tooth-provided bars receivable in said shank or between the separable or independent members thereof, means to secure the parts together, such shank and bar or bars respectively having therein longitudinal and lateral clearance passages for the chips cut by the teeth, and certain adjusting elements, together with an auxiliary finishing cutter or cutters, if required, and such other auxiliary and subsidiary parts and members as may be needed or desired in order to render the broach complete in every respect, all as hereinafter set forth.

The primary object of my invention is to decrease the expense of manufacturing broaches, without sacrificing the accuracy and efficiency thereof. I attain this object by forming a plurality of teeth from or on a single bar, and cutting lateral chip-clearance passages in such bar between said teeth, and by uniting the bar with a shank or shank elements in such a manner that exact alignment of the teeth and proper projection of the same are obtained. The disadvantage and difficulty of making separate teeth and properly assembling them in a shank are thus overcome or obviated, and this without going back to the old type of broach in which shank and teeth are integral.

A further object is to provide a broach of this character with adequate means for adjustment of the cutter bar or bars.

Still another object is to provide the broach with suitable means for attaching the same to the machine in which it is used, and utilizing such means as an element in fastening together the parts and assisting in the formation of the broach.

The teeth at and adjacent to the rear end of a broach of this character are liable to become worn, and these, being the teeth which cut the deepest part of the slot, when worn, fail to complete the slot or to cut said part thereof with the same degree of accuracy that the shallower part of the slot is cut by the leading teeth, and a further object of my invention is to overcome this difficulty, which I do by providing a finishing tooth or teeth behind the last of what may be termed the regular teeth of the broach.

The cutter bar or bars can be readily removed from the broach for regrinding, or for the substitution of other bars therefor, as may be desired, or in order to reverse such bar or bars when they have teeth on both longitudinal edges. Teeth constructed in this manner, that is to say, as parts of a bar, can be reground easily and accurately, much more easily and accurately, in fact, than can independent or separable teeth, or teeth that are integral with their shank.

Other objects and advantages will appear in the course of the following description.

I attain the objects and secure the advantages of my invention by the means illustrated in the accompanying drawings, in which—

Figure 1 is a top plan of a broach, the central portion of the same being broken out, which embodies a practical form of my invention; Fig. 2, a rear end elevation of said broach; Fig. 3, a side elevation in partial section of the parts of said broach which appear in the first view, the sectional parts including the rear-end portion and a portion near the front end of the broach; Fig. 4, a top plan of a broach, the intermediate portion being broken out, showing a modified form of cutter bar; Fig. 5, an end elevation of said last-named broach; Fig. 6, a side elevation in partial section of the part of said last-named broach that includes the rear-end portion thereof, and Fig. 7, a cross section through the second broach, taken on lines 7ª—7ª, looking in the direction of the associated arrow, in Fig. 6.

Similar reference characters designate similar parts throughout the several views.

The right-hand end of the broaches, as they appear in the drawings, are the front ends thereof, regardless as to whether the broach be pulled, as is the more usual procedure, or be pushed or forced from behind, through the work, inasmuch as the leading and least projecting tooth or teeth of the broach are the right-hand teeth, and the teeth project more and more as the rear end of the broach is approached.

The terms top, bottom, and side, or equivalent terms, apply to the broaches as they are represented in the drawings, and would not always be applicable to the broaches as they might be disposed for some kinds of work or in certain machines.

Referring first to the broach illustrated in Figs. 1, 2, 3, it will be observed that the same comprises a shank consisting of two side pieces or sections 1, an inserted cutter bar 2 having formed on the outer or exposed edge thereof, and on the opposite edge if desired and as herein shown, pluralities of teeth 3, a rear-end, filling and abutment block 4, a front-end, filling and abutment block 5, a finishing cutter 6, and a puller 7. This broach is provided in one side, that which is adjacent to the inner teeth 3, with a longitudinal, chip-clearance passage 8. The passage 8 extends in the shank back from the block 5 to open through the rear end of said shank. A plurality of lateral, chip-clearance passages 49, which are oblique with the same pitch as that of the front sides or edges of the exposed teeth 3, and that of the rear sides or edges of the inner teeth 3, are cut or otherwise formed in opposite sides of the bar 2. The passages 49 open at their outer ends in front of the exposed teeth 3, and at their inner ends behind the hidden teeth 3 into the passage 8. The latter extends under or past the inner ends of the block 4 and the finishing cutter 6. These or similar or corresponding chip-clearance passages are present in each of the broach construction, as will hereinafter be made clear.

The shank sections 1 are formed from solid, cylindrical stock and proportioned to receive between them the cutter bar 2 and with such bar to form parts of a circle struck from the axis of the bar as a center, so that the broach when complete fits a round hole. The same general statement applies also to the other shank sections and shanks. The adjacent faces of the sections are flat throughout their entire lengths and parallel with each other when the bar 2 is in place; consequently opposite sides of said bar also must be flat, except where cut in to form the passages 49, and parallel with each other.

The bar 2, which originally was a flat piece of stock of the proper width to fit between the shank sections 1 and space said sections the required distance apart, has the chip-clearance passages 49 cut in opposite sides thereof, and the two sets of teeth 3 formed on the longitudinal edges thereof, all as previously intimated and stated. The teeth 3 extend inwardly from the side edges of the bar 2 in offset or alternate arrangement. That is to say, one tooth extends inwardly from one side edge of the bar 2, the next succeeding tooth extends inwardly from the other side edge of said bar, the third tooth extends inwardly from the first-named edge, and so on. Each tooth 3 extends inwardly past the longitudinal center of the edge of the bar 2 upon which such tooth is located, or beyond the major central plane of said bar, so that the teeth 3 lap by each other, in a sense, and cut a slot of the full width and without leaving any stock projecting into said slot in the longitudinal center thereof. The two leading teeth 3 in a set may be of the same height, or have the same amount of projection, the next two following teeth may have the same amount of projection, but more than said first two, and so on, so that each pair of teeth of the same amount of projection cut clear across the slot in the same plane; but this arrangement may be changed, and one substituted wherein each succeeding tooth projects slightly more than the immediately preceding tooth.

The block 4 is inserted between the shank sections 1 immediately behind the cutter bar 2, and the block 5 is inserted between said sections immediately in front of said bar. The blocks 4 and 5 are secured in place with pluralities of pins 9, or by other suitable means, which pass through the sections 1 and said blocks.

The puller 7 has a tail-piece 10 which enters between the shank sections 1 at their forward ends, in front of the block 5, and is secured in place by means of a pin 11. The rear end of the tail-piece 10 is in contact with the front end of the block 5, and the shouldered parts of the puller 7, indicated at 45—45, contact with the front ends of the sections 1. In the center of the puller 7 is a hole 12 for the passage of a pin (not shown) by means of which said puller is attached to the machine in or with which the broach is used.

Each of the blocks 4 and 5 is provided with two horizontal, adjusting screws 13. The screws 13 are tapped into and through the blocks 4 and 5 from the rear end of the former and the front end of the latter, and the adjacent terminals of the two pairs of said screws enter corresponding recesses 14—14 in the rear and front ends of the cutter bar 2. The recesses 14 are so arranged relative to the conical ends of the screws 13, which enter said recesses, that, upon loosening either of the rear screws and tightening the other, the rear end of the bar 2 is raised or lowered accordingly, and upon loosening either of the forward screws and tightening the other, the front end of said bar is raised or lowered accordingly. Thus provision is made for a very fine adjustment of the bar 2 at either or both rear ends, whereby is obtained the proper amount of projection of the exposed rear teeth 3, and, in fact, of all of the exposed teeth. This is essential when the parts of the broach are first assembled, and again whenever the cutting edges of the exposed teeth 3, and especially of the exposed rear teeth, become worn off crosswise. If the bottom screw 13 be loosened and the top screw 13 be tightened, at either end of the bar 2, said bar is depressed at such end, and if the top screw be loosened and the bottom screw be tightened at either end of the bar, the latter is elevated at the rear end. The amount of projection of the bar 2 as a whole can be increased or decreased by proper adjustment of all of the screws 13. The amount of adjustment required of this character is very slight indeed, so that the screws 13 afford ample provision therefor. The screws 13 might be omitted from the block 5.

In order to be able to broach to the best advantage and produce the desired effects or results, it has been found to be necessary to provide and exert a major force behind the teeth to actuate or impel them through the work, instead of a drawing force solely which is exerted at the front end, consequently I construct my broach so that the major operating force is applied to the rear end of the cutter bar 2, through the medium of the block 4 which is secured to the shank behind said bar, and regardless of the manner in which said broach is actuated or forced through the work, that is to say, regardless of the end of the broach to which the power is directly applied. Thus a construction, wherein and whereby the force or the greater part thereof is always transferred from the shank to the rear end of the cutter bar 2, is of the utmost importance and value. I obtain this effect with all of the broaches herein shown and described.

A screw 15 should usually be employed to fasten the parts together intermediate of their ends, in order to prevent the shank sections 1 from springing apart in the center, and for the purpose of assisting in retaining the bar 2 in place between the sections 1. The screw 15 extends laterally through the sections 1 and the cutter bar 2. This screw does, of course, exert some force on the bar, transferring the same from the rear end to an intermediate point, but the amount is not sufficient to destroy or seriously impair the effect produced by the application of force to said rear end.

For reasons hereinbefore given, it is frequently desirable to provide a finishing cutter to remove from the sides of the slot cut by the teeth 3 any portions of stock that may be left by the rearmost teeth 3, in the event said teeth become worn on their outer sides, and to this end the cutter 6 is provided. The cutter 6 is received between the shank sections 1 at their rear ends and immediately behind the block 4, and a screw 16 is employed to hold said cutter in place, said screw passing laterally through said sections and cutter. At the exposed, protruding end of the cutter 6 is a pair of finishing teeth 17. The teeth 17 are spaced apart, inasmuch as their office is merely to cut out the corners and cut away the sides of the slot cut by the teeth 3 in front of the teeth 17, and thus finish or complete such slot, and extending downwardly from the space between said teeth 17 is a narrower recess or slot 18. Thus the outer portion of the cutter 6 is split on a radius of the broach. A horizontal screw 19 is tapped into the slotted or split part of the cutter 6, below or inside of the plane of the bases of the teeth 17. At the front end of the tapped opening for the screw 19 is an extension 20 of such opening, which extension is much smaller in diameter than said tapped opening, and into said extension the inner end of said screw protrudes, such end being conical. Therefore, upon turning the screw 19 inwardly, the split portion of the cutter 6 is more widely spread, and the teeth 17 separated to a greater extent, so that they are adapted to finish a wider slot; and, upon turning said screw outwardly, said split portion is permitted to contract, and said teeth are caused to approach each other, wherefore their cutting range is diminished. The teeth 17 cut away but very small portions of the slot cut by the exposed teeth 3, consequently whatever chips are produced by said first-named teeth escape between them and pass out at the rear end or edge of the cutter 6, into the passage in the stock behind the broach, provided such chips are sufficiently numerous or of a size to require or necessitate their escape in this manner.

It will have been observed that the chip-clearance passages 49 on opposite sides of the cutter bar 2 are not directly opposite to each other, but in offset relationship to correspond with the teeth 3.

The broach shown in the next four views is similar to the first except that a wider cutter bar 12 is provided, chip-clearance passages 22 are cut into said bar on one side only, and the bar is provided with teeth 23, two sets in this as in the first case, although one set might be omitted in either case, which teeth are all of the same width and have their sides in alignment, so that each of said teeth cuts the entire width of the slot, instead of only a little more than half of such width as in said first case. The slots 22 are cut a little deeper than the width of the teeth 23, as is clearly shown at 24 in Fig. 4, that there may be provided adequate clearance for the chips produced by said teeth. In this construction the cutter bar 21 extends farther on one side of the central plane of the teeth 23 than it does on the other side, or extends beyond said teeth on one side, as will be seen upon referring to Figs. 4 and 5. Due to this fact one shank section, as 25, is smaller than the other shank section, as 26, and is provided on the inside face with a ledge 47 to receive the inner edge of the aforesaid offset part of the bar 21, and assist in supporting said bar. A rear block 27 is here employed which is wider than the corresponding block in the broach herein first described, and a front block 28 is provided which is also wider than the block 5 in the other example, and said block 28 has a forwardly-extending part 29 to fill the space between the adjacent portion of the shank section 25 and the projection or extension 10 from the puller 7. Otherwise the second broach is like the first, and a finishing cutter similar to the cutter 6 may be provided therefore, if desired, or the cutter 6 itself might be used without change upon making provision for centering the same.

In the event the bar 26 be adjusted so that a space is left between the ledge 47 and the offset part of said bar, a wedge or shim, as represented at 48 in Fig. 7, may be inserted to fill such space.

When the teeth of either the bar 2 or the bar 21, which are first used, become worn, such bar is reversed to expose the other set of teeth with which the bar is provided.

It is obvious that the cutter bar in either broach can be removed for any purpose by driving out the pins and removing the screws which secure the parts together, and that the parts can be reassembled again without difficulty.

These broaches operate in substantially the same manner as do other broaches designed for a similar purpose. The chips cut by the teeth pass inwardly and in front of said teeth through the laterally-extending, oblique, clearance passages into the longitudinal clearance passage, and escape at the rear end of last-named passage, in each case.

More or less change in matters of shape, size, construction, and arrangement of some or all of the parts of the broach, in addition to those which have been particularly pointed out, may be made without departing from the spirit of my invention or exceeding the scope of what is claimed.

What I claim as my invention, and desire to secure by Letters Patent, is—

1. As an improved article of manufacture, a broach comprising a divided shank, and an inserted cutter bar having teeth formed on the exposed edge thereof, and side chip-clearance passages therein extending from said edge to the opposite edge, said shank having a longitudinal passage therein into which said first-named passages open at their inner ends.

2. As an improved article of manufacture, a broach comprising a divided shank, and an inserted cutter bar having teeth on its exposed edge, said teeth being in offset relationship, and also having side-chip-clearance passages therein extending from said edge to the opposite edge, said shank having a longitudinal chip-clearance passage therein into which the inner ends of said first-named passages open.

3. As an improved article of manufacture, a broach comprising a divided shank, and an inserted cutter bar having teeth on its exposed edge, said teeth being in offset relationship, and extending inwardly beyond the major central plane of said bar, and the latter also having chip-clearance passages in both sides thereof, which passages extend from said edge to the opposite edge, and said shank having a longitudinal chip-clearance passage therein into which the inner ends of said first-named passages open.

4. As an improved article of manufacture, a broach comprising a divided shank, and an inserted cutter bar having teeth on its exposed edge, said teeth being in offset relationship, and said bar also having chip-clearance passages in both sides thereof, which passages extend from said edge to the opposite edge, and inwardly from said sides beyond the major central plane of said bar, and said shank having a longitudinal chip-clearance passage therein into which said first-named passages open at their inner ends.

5. As an improved article of manufacture, a broach comprising a divided shank, and an inserted cutter bar having teeth on its exposed edge, said teeth being in offset relationship, and extending inwardly beyond the major central plane of said bar, and said bar also having chip-clearance passages in both sides thereof, which passages extend from said edge to the opposite edge, and inwardly beyond said plane, and said shank having a longitudinal chip-clearance passage therein into which said first-named passages open at their inner ends.

6. As an improved article of manufacture, a broach comprising a divided shank, an inserted cutter bar having teeth formed on the exposed edge thereof, and side chip-clearance passages therein extending from said edge to the opposite edge, said shank having a longitudinal chip-clearance passage therein into which said first-named passages open at their inner ends, and means in said shank at opposite terminals of said bar to hold the same in place.

7. As an improved article of manufacture, a broach comprising a divided shank, an inserted cutter bar having teeth formed on the exposed edge thereof, and side chip-clearance passages therein, said shank having a longitudinal chip-clearance passage into which said first-named passages open at their inner ends, means to hold said bar in place in said shank, and means to adjust said bar at the rear terminal thereof to increase or decrease the projection of the rear teeth.

8. As an improved article of manufacture, a broach comprising a divided shank, an inserted cutter bar having teeth formed on the exposed edge thereof, and side chip-clearance passages therein, said shank having a longitudinal chip-clearance passage into which said first-named passages open at their inner ends, means to hold said bar in place in said shank, and means to adjust said bar at the front terminal thereof to increase or decrease the projection of the front teeth.

9. As an improved article of manufacture, a broach comprising a divided shank, an inserted cutter bar having teeth formed on the exposed edge thereof, and side chip-clearance passages therein, said shank having a longitudinal chip-clearance passage into which said first-named passages open at their inner ends, means to hold said bar in place in said shank, and means to adjust said bar at both terminals thereof to increase or decrease the projection of the teeth on said exposed edge.

10. As an improved article of manufacture, a broach comprising a divided shank, an inserted cutter bar having teeth formed on the exposed edge thereof, and side chip-clearance passages therein, inserted end blocks for said bar, and means to secure said shank and blocks together, said shank having a longitudinal chip-clearance passage therein into which said first-named passages open at their inner ends.

11. As an improved article of manufacture, a broach comprising a divided shank, an inserted cutter bar having teeth formed on the exposed edge thereof, and side chip-clearance passages therein, means to retain said bar in said shank, said shank having a longitudinal chip-clearance passage therein into which said first-named passages open at their inner ends, and a puller at the leading end of said shank.

12. The combination, in a broach, with a divided shank, an inserted cutter bar having teeth formed on the exposed edge thereof, and side chip-clearance passages therein, an inserted block in said shank behind said bar, means to secure said block to said shank, said shank having a longitudinal chip-clearance passage therein into which said first-named passages open at their inner ends, and securing means for said bar at the forward end thereof, of adjusting screws in said block in engagement with said bar, said screws being adapted to increase and decrease the amount of projection of the bar at its rear terminal.

13. The combination, in a broach with a divided shank, an inserted cutter bar having teeth formed on the exposed edge thereof, and side chip-clearance passages therein, an inserted block in said shank in front of said bar, means to secure said block to said shank, said shank having a longitudinal chip-clearance passage therein into which said first-named passages open at their inner ends, and securing means for said bar at the rear end thereof, of adjusting screws in said block in engagement with said bar, said screws being adapted to increase and decrease the amount of projection of the bar at its front terminal.

14. The combination in a broach, with a divided shank, an inserted cutter bar having teeth formed on the exposed edge thereof, and side chip-clearance passages therein, inserted blocks in said shank in front of and behind said bar, and means to secure said blocks to said shank, said shank having a longitudinal chip-clearance passage therein, into which said first-named passages open at their inner ends, of adjusting screws in said blocks in engagement with said bar, said screws being adapted to increase and decrease the amount of projection of the bar.

15. The combination, in a broach, with a divided shank, an inserted cutter bar having teeth formed on the exposed edge thereof, and side chip-clearance passages therein, and means to secure said bar in said shank, said shank having a longitudinal chip-clearance passage therein into which said first-named passages open at their inner ends, of a finishing cutter secured to said shank in the rear of said bar.

16. The combination, in a broach, with a divided shank, an inserted cutter bar having teeth formed on the exposed edge thereof, and side chip-clearance passages therein, inserted blocks at the ends of said bar, and means to secure said blocks to said shank, the latter having a longitudinal chip-clearance passage therein into which said first-named passages open at their inner ends, of a member passing through said shank and bar intermediate of their ends to bind the parts together.

17. The combination, in a broach, with a divided shank, an inserted cutter bar having teeth formed on the exposed edge thereof, and side chip-clearance passages therein, means to secure said bar at its rear end in place in said shank, said shank having a longitudinal passage therein into which said first-named passages open at their inner ends, of means to secure said bar at its forward end in place in said shank, said latter means consisting in part of a puller provided with a securing element for the shank and bar members at their forward terminals.

18. The combination, in a broach, with a divided shank, inserted means having teeth formed on the exposed edge thereof, and side chip-clearance passages therein, said shank having a longitudinal chip-clearance passage therein into which said first-named passages open at their inner ends, and means at the ends of said first-named means to secure the same in place in said shank, of a finishing cutter behind said first-named means, said cutter having at its exposed ends finishing teeth which are behind said first-named teeth, and being provided with adjusting means for said finishing teeth.

19. As an improved article of manufacture, a broach comprising a divided shank, an inserted cutter bar having teeth formed on the exposed edge thereof, and side chip-clearance passages therein extending from said edges to the opposite edge and beyond said teeth on one side and said shank having a longitudinal chip-clearance passage therein into which said first-named passages open at their inner ends, and means to secure said bar to said shank.

20. As an improved article of manufacture, a broach comprising a divided shank provided with an interior ledge, an inserted cutter bar provided with an offset part adapted to be supported by said ledge, and having teeth formed on the exposed edge thereof, and side chip-clearance passages therein, said passages extending beyond one side of said teeth, into said offset part, and said shank having a longitudinal chip-clearance passage therein into which said first-named passages open at their inner ends, and means to secure said bar to said shank.

21. As an improved article of manufacture, a broach comprising a divided shank, an inserted cutter bar having teeth formed on the exposed edge thereof, and side chip-clearance passages therein extending from said edge to the opposite edge, and said shank having a longitudinal chip-clearance passage therein into which said first-named passages open at their inner ends, and means in said shank behind said bar to force the latter forwardly when the shank is actuated forwardly by power applied at either end thereof.

JOHN OAKLEY.

Witnesses:
A. C. FAIRBANKS,
F. A. CUTTER.